United States Patent [19]

Krstovic

[11] Patent Number: 4,544,309

[45] Date of Patent: Oct. 1, 1985

[54] ADJUSTABLE CUTTING OR BORING TOOL

[76] Inventor: Dragisa Krstovic, 6307 Westlake Ave., Parma, Ohio 44129

[21] Appl. No.: 538,488

[22] Filed: Mar. 29, 1984

[51] Int. Cl.$^4$ ........................................... B23B 29/02
[52] U.S. Cl. .................................. 408/157; 408/158; 408/168
[58] Field of Search ............... 408/147, 153, 154, 157, 408/158, 161, 162, 163, 173, 178, 179, 181, 182, 183, 155, 156, 159, 160, 164, 165, 166, 167, 171, 168

[56] References Cited

U.S. PATENT DOCUMENTS

| | | | |
|---|---|---|---|
| 1,571,339 | 2/1926 | Madden | 408/157 |
| 2,278,631 | 4/1942 | Young | 408/157 |
| 2,772,870 | 12/1956 | Anderson et al. | 408/182 X |
| 3,237,486 | 3/1966 | Gilbert et al. | 408/181 X |
| 4,229,127 | 10/1980 | Bartley | 408/158 |
| 4,260,303 | 4/1981 | Newman | 408/181 X |
| 4,278,372 | 7/1981 | Heisner | 408/157 X |
| 4,343,576 | 8/1982 | Lagerholm et al. | 408/157 X |

FOREIGN PATENT DOCUMENTS

| | | | |
|---|---|---|---|
| 0210917 | 2/1924 | United Kingdom | 408/157 |
| 0759243 | 8/1980 | U.S.S.R. | 408/180 |

Primary Examiner—William R. Briggs
Assistant Examiner—Glenn L. Webb
Attorney, Agent, or Firm—Maky, Renner, Otto & Boisselle

[57] ABSTRACT

Tool includes a plurality of circumferentially spaced radially extending guideways in an end face thereof for receipt of a corresponding number of cutting tool holders. The radial inner ends of the holders have cam followers thereon which are urged radially inwardly by spring members into engagement with one or more correspondingly tapered cam surfaces on a central pusher element. The pusher element is supported for axial movement within a longitudinal bore in the cutting tool and is precisely axially movable in opposite directions to cause precise radial inward and outward movement of the tool holders within such guideways.

20 Claims, 5 Drawing Figures

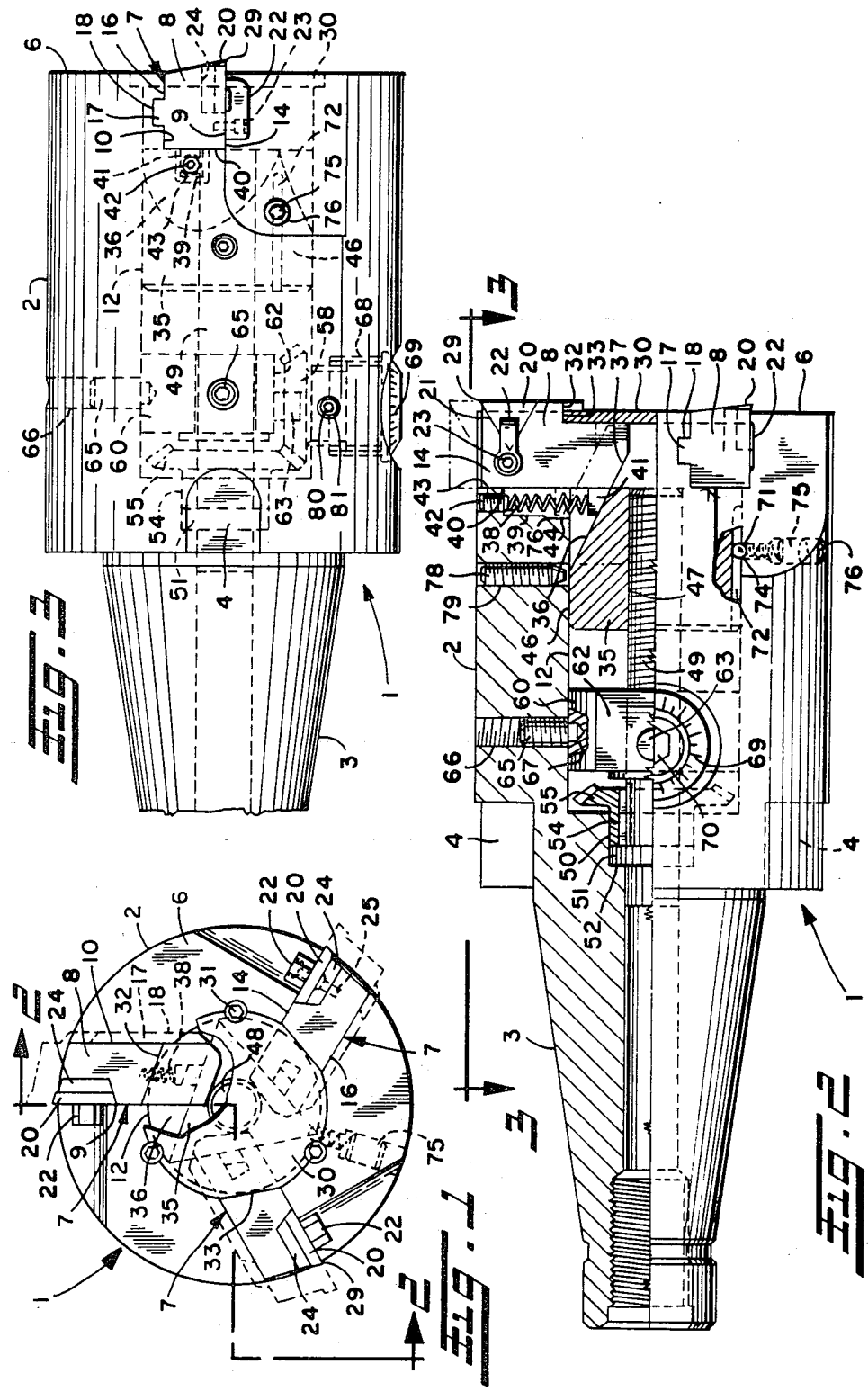

4,544,309

ADJUSTABLE CUTTING OR BORING TOOL

BACKGROUND OF THE INVENTION

This invention relates generally as indicated to an adjustable cutting or boring tool and more particularly to a novel cutting head including a plurality of cutting tool holders mounted thereon for precise simultaneous adjustment of the cutting elements.

Cutting tools including a plurality of cutters which are simultaneously radially adjustable by actuation of a single actuator are generally known. The present invention relates to certain improvements in cutting tools of this same general type.

SUMMARY OF THE INVENTION

A principal object of this invention is to provide a cutting tool generally of the type indicated which is of relatively simple construction and includes relatively few parts that cooperate with each other to provide for precise adjustment of the cutting elements to the exact cutting position desired.

These and other objects of the present invention may be achieved by providing the cutting tool with an end face having a plurality of circumferentially spaced radially extending guideways therein for receipt of a corresponding number of cutting tool holders. The radial inner ends of the holders have cam followers thereon which are urged radially inwardly by spring members into engagement with one or more correspondingly tapered cam surfaces on a central pusher element. The pusher element is supported for axial movement within a longitudinal bore in the cutting tool and is precisely axially movable in opposite directions within such bore to cause precise radial inward and outward movement of the tool holders within such guideways. Also contained within such longitudinal bore is a pusher shaft which has one end connected to the pusher element and its opposite end coaxially supported in a smaller stepped bore at the inner end of the longitudinal bore. Axial movement of the pusher element is obtained by rotating the pusher shaft through a set of bevel gears. One of the bevel gears is coaxially mounted on the pusher shaft adjacent the end opposite the pusher element and is supported within the stepped bore along with the pusher shaft. The other bevel gear is mounted in a radial opening in the tool holder at right angles to the first bevel gear and is supported by a pilot member in the longitudinal bore which also provides a bearing support for the pusher shaft intermediate the ends thereof.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicated, however, of but several of the various ways in which the principles of the invention may be employed.

BRIEF DESCRIPTION OF THE DRAWINGS

In the annexed drawings:

FIG. 1 is an end elevation view of a preferred form of adjustable cutting or boring tool in accordance with this invention;

FIG. 2 is a fragmentary longitudinal section through the tool of FIG. 1, taken substantially along the plane of the line 2—2 thereof;

FIG. 3 is a top plan view of the tool of FIG. 2 generally as seen from the plane of the line 3—3 thereof;

DETAILED DESCRIPTION OF THE PREFERRED EMBODIMENTS

Figure 4:
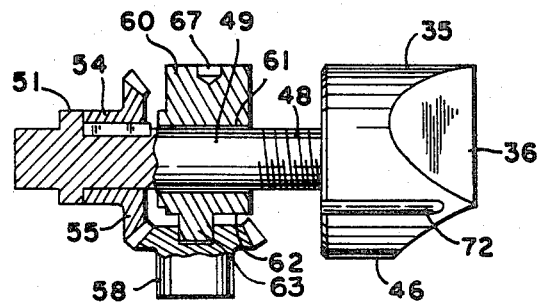
FIG. 4 is a side elevation view, partly in section, showing the pusher element of the cutting tool and associated drive mechanism for causing axial movement of the pusher element, which in turn causes simultaneous radial movement of all of the tool cutting elements.

Referring now in detail to the drawings and initially to FIGS. 1–3, a preferred form of cutting or boring tool in accordance with this invention is generally indicated by the reference numeral 1, and includes a cutting or boring head 2 having a tapered shank 3 at one end for attachment to a machine tool of suitable type. A pair of diametrically opposed keyways 4 may be provided adjacent the inner end of the tapered shank for driving engagement by keys on the machine tool (not shown).

At the end of the boring head 2 opposite the tapered shank 3 is a generally flat, radially extending end face 6 in which there are a plurality of circumferentially spaced, radially extending guideways 7 adapted to receive a corresponding number of tool insert holders 8. Although the number of guideways 7 and associated tool insert holders 8 may be varied depending on the size of the tool and the type of machining operations to be performed thereby, in the preferred form of tool disclosed herein, three such guideways 7 are provided in the end face 6, each spaced approximately 120° apart. The leading side edge 9 of each guideway is in substantially direct radial alignment with the axial center of the boring head, whereas the trailing side edge 10 of each guideway is parallel to and spaced from the associated leading side edge. Each guideway 7 extends radially from the outer periphery of the boring head to a central bore or opening 12 extending longitudinally into the boring head from the end face 6 thereof.

Each of the tool insert holders 8 may be of identical construction and includes parallel spaced apart side walls 14, 16 adapted for close sliding engagement with the respective leading and trailing side edges 9, 10 of the guideways 7 to permit radial movement of the tool insert holders relative to the boring head but not relative rotational movement. The tool insert holders are inserted into the respective guideways through the bore 12 at the radial inner ends thereof and are retained against axial movement in the guideways by a key 17 on the trailing side wall 16 of each tool insert holder which is received in a keyway 18 in the trailing side edge 10 of the respective guideway.

Attached to the leading side wall 14 of each tool insert holder 8 adjacent the radial outer edge thereof is a removable carbide cutter 20. Preferably, a generally triangular shape slot 21 is provided in such holder side wall 14 for receipt of the carbide cutter. The carbide cutter may be removably held within the triangular shape slot as by a clamp 22 which is movable into and out of clamping engagement with the outer face of the carbide cutter by tightening and loosening a locking screw 23 threadedly received in a hole in the tool insert holder. As the carbide cutter wears out, it is a simple matter to replace the carbide cutter, it only being necessary to loosen the locking screw 23 and slide the cutter out of the slot. A hard carbide insert 24 may also be provided in the slot 21 beneath the carbide cutter to provide a hard support surface for the carbide cutter. The insert may be held in place by means of a screw 25 passing through the carbide cutter insert into a threaded opening in the bottom wall of the slot 21.

A longitudinal slot 28 may be provided in the outer periphery of the boring head adjacent the leading side edge 9 of each guideway 7 for receipt of the tool insert clamps 22 when the tool insert holders 8 are in their radial innermost positions with the radial outer cutting edges 29 of the carbide cutters 20 recessed within the guideways as shown in FIGS. 1 and 2. Further radial inward movement of the tool insert holders 8 is prevented by a removable end plate 30 which may be attached to the outer end of the longitudinal bore 12 by a plurality of fasteners 31 threadedly received in holes in the end face 6 (FIG. 1). Each tool insert holder 8 has an angularly sloped stop shoulder 32 on the front face thereof which overlies a correspondingly angled stop surface 33 on the end plate 30, there being provided one such stop surface 33 for each tool insert holder 8.

Precise radial adjustment of the tool insert holders to the exact cutting positions desired for the carbide cutters 20 is obtained by precise longitudinal movement of a pusher element 35 within the longitudinal bore 12 in the boring head. In the preferred form of boring head shown in FIGS. 1-3, the pusher 35 has a plurality of circumferentially spaced cam surfaces 36 thereon, corresponding in number to the number of tool insert holders 8 within the boring head. The cam surfaces 36 are tapered as best seen in FIGS. 3 and 4 and are engaged by correspondingly angled cam followers 37 on the radial inner ends of the tool insert holders (FIG. 2). Such cam followers 37 are maintained in engagement with the respective cam surfaces 36 by compression springs 38 contained in radial slots 39 in the back side 40 of each guideway 7. The springs 38 may be compressed between a flange or shoulder 41 extending axially inwardly from the back side of the tool insert holders 8 and a spring loading screw 42 contained in a radial bore 43 in the boring head in radial alignment with the associated radial slot 39. The radial bores 43 extend radially outwardly to the outer diameter of the boring head and are threaded for threaded engagement by the spring loading screws 42, thereby permitting the preload on the springs to be varied by rotating the spring loading screws. The radial inner ends of the slots 39 may be undercut at 44 for a portion of their length for receipt of the tool insert holder flanges 41 as the tool insert holders 8 are moved radially outwardly to their radial outermost positions shown in phantom lines in FIGS. 1 and 2 during axial outward movement of the pusher 35 as described hereafter.

The pusher 35 is desirably generally cylindrical except for the cam surfaces 36 thereon, thus providing a cylindrical portion 46 which has an outer diameter closely matching the inner diameter of the longitudinal bore 12 to provide a close sliding fit therebetween for supporting the pusher for axial movement within the bore. Also, the pusher has a threaded opening 47 extending through the longitudinal center thereof for threaded engagement by the threaded end portion 48 of a pusher shaft 49. Adjacent the inner end of the longitudinal bore is a stepped bore 50 of reduced diameter which closely slidably receives a radial flange 51 adjacent the inner end of the pusher shaft 49 to provide a bearing support for supporting the pusher shaft coaxially within the boring head and also provide a thrust shoulder 52 which is engaged by the axial inner face of the flange 51 for absorbing axial thrust loads.

The opposite face of the radial flange 51 is engaged by the hub 54 of a bevel gear 55 which may extend axially into the stepped bore 50 in close sliding engagement therewith. The bevel gear 55 is keyed to the pusher shaft 49, whereby rotation of the bevel gear also causes the pusher shaft to rotate. The teeth of the bevel gear face forwardly and are engaged by the teeth of another bevel gear 58 oriented 90° relative to the bevel gear 54. The bevel gear 58 is supported on a pilot member 60 within the bore 12, such pilot member having a longitudinal opening 61 therethrough of a diameter slightly greater than the diameter of the pusher shaft 49 to permit sliding and rotational movement of the pusher shaft relative to the pilot member. The pilot member is substantially cylindrical except for a flat face 62 on one side thereof which provides a bearing support for the bevel gear 58. A post 63 extends outwardly from the flat face 62 for receipt of the bevel gear 58 thereon. The outer diameter of the cylindrical portion 64 of the pilot member 60 closely matches the inner diameter of the longitudinal bore 12 in the boring head, whereby the longitudinal bore provides a bearing support for the pilot member and pusher shaft 49 supported thereby. The pilot member may be held against both rotational and longitudinal movement within the bore 12 as by means of a plurality of lock screws 65 threadedly received in radial openings 66 in the boring head, such lock screws extending into engagement with mating recesses 67 in the outer surface of the pilot member. Three such lock screws 65 are shown, two of which are diametrically opposed to each other and offset 90° from the flat face 62 on the pilot member, and the third lock screw is disposed diametrically opposite such flat face.

The bevel gear 58 is inserted over the post 63 through a radial opening 68 in the boring head and is retained within such opening as by means of a micrometer dial 69 threadedly received in such opening.

To rotate the gear 58, a non-circular socket 70 may be provided within the axial center thereof for engagement by a suitably sized wrench. Rotation of the bevel gear 58 causes a corresponding rotation of the bevel gear 55 which in turn causes the pusher shaft 49 to rotate. The pusher 35 is threaded onto the pusher shaft as aforesaid, and is restrained against rotation by means of a ball 71 which engages a keyway 72 in the cylindrical surface 46 of the pusher. The ball 71 may be retained within a socket 74 in the wall of the longitudinal bore 12 by a retaining screw 75 rotatably received in a radial opening 76 in the boring head. Accordingly, rotation of the pusher shaft 49 in opposite directions will cause axial movement of the pusher 35 in opposite directions at a rate which is determined by the rate of rotation of the pusher shaft and the pitch of the mating threads on the pusher shaft and pusher.

During axial outward movement of the pusher, the cam surfaces 36 on the pusher force the tool insert holders 8 radially outwardly within their respective guideways 7. The maximum radial outward movement of the tool insert holders is determined by engagement of the flanges 41 on the tool insert holders with associated stop shoulders 76 at the radial outer ends of the undercuts 44 in the radial slots 39 (FIG. 2).

When the pusher is fully extended, a pair of adjustment stop screws 78 threadedly received in diametrically opposed radial openings 79 in the boring head in alignment with the back side of the pusher when in such fully extended position may be screwed into overlapping engagement with such back side to firmly lock the pusher in place and take up some of the thrust loads that would otherwise be transmitted to the mating threads of the pusher rod and pusher during the cutting operation. One such stop screw 78 is shown in FIGS. 2 and 3. Also, a set screw 80 may be provided in another radial opening 81 in the boring head (FIG. 3) for locking the bevel gear 58 in any desired adjusted position.

To retract the tool insert holders from their fully extended positions, the adjustment stop screws 78 must first be backed off so as not to interfere with the axial inward movement of the pusher. Also, the set screw 80 must be loosened to permit rotation of the bevel gear 58 in a direction causing axial inward movement of the pusher 35. As the pusher moves axially inwardly, the compression springs 38 act as return springs, keeping the cam followers 37 on the inner ends of the tool insert holders 8 in contact with the cam surfaces 36 on the pusher.

Figure 5:
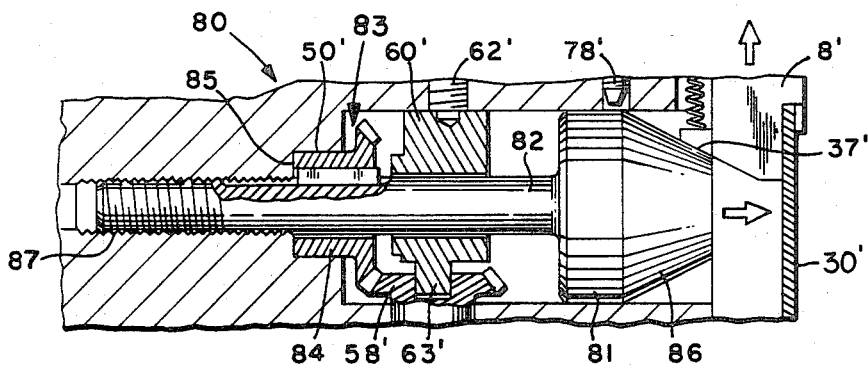
FIG. 5 is a fragmentary longitudinal section through a modified form of cutting or boring tool in accordance with this invention.

In an alternate form of adustable boring head 80 shown in FIG. 5, the pusher 81 is integrally connected to the pusher shaft 82 for rotation therewith. Also, the pusher shaft is threaded at the axial inner end thereof for threaded engagement with a smaller diameter bore 87 coaxial with the stepped bore 50', whereby rotation of the pusher shaft will cause the pusher shaft and pusher 81 attached thereto to move axially. A bevel gear 83 is concentrically mounted on the pusher shaft and keyed thereto to cause the pusher shaft to rotate when rotated by the bevel gear 58' and at the same time permit the pusher shaft to move axially relative to the bevel gear 83. The hub 84 of the gear 83 extends axially into the stepped bore 50' in close sliding engagement therewith with its axial inner end in engagement with the axial inner end 85 of the stepped bore to absorb axial thrust loads. Moreover, instead of there being a plurality of circumferentially spaced cam surfaces on the pusher 81, the entire forward end of the pusher is generally conical to provide a cam surface 86 for engagement by the cam followers 37' on the radial inner ends of the tool insert holders 8' during both rotational and axial movement of the pusher. Otherwise, the details of construction and operation of the tool holder 80 of the FIG. 5 embodiment are substantially the same as the tool holder shown in FIGS. 1-4, and the same reference numerals followed by a prime symbol are used to designate like parts.

Although the invention has been shown and described with respect to a certain preferred embodiments, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A cutting tool comprising a cutting head having a generally radially extending end face at one end, a central opening extending longitudinally into said cutting head from said end face, a plurality of circumferentially spaced guideways in said end face extending radially from the outer periphery of said cutting head to said central opening, each said guideway having a cutting tool holder mounted for radial movement therein, pusher means mounted for axial movement in said central opening into engagement with the radial inner ends of said cutting tool holders to cause simultaneous radial outward movement of said cutting tool holders, and means for moving said pusher means axially within said central opening, said means for moving said pusher means axially within said central opening comprising a pusher shaft extending axially inwardly from said pusher means, means for rotating said pusher shaft in said central opening, and means for causing axial movement of said pusher means in response to such rotation of said pusher shaft, said means for rotating said pusher shaft comprising a first bevel gear keyed to said pusher shaft, and a second bevel gear extending at right angles to said first bevel gear and in meshing engagement therewith, said second bevel gear being accessible for rotation through a radial opening in said cutting head, and a pilot member in said central opening surrounding said pusher shaft, said pilot member being secured in place within said central opening and having a flat face on one side which provides a bearing support for said second bevel gear.

2. The cutting tool of claim 1 further comprising a post on said flat face for receipt of said second bevel gear thereon.

3. The cutting tool of claim 1 wherein there is a threaded connection between said pusher means and said pusher shaft, and means are provided for retaining said pusher shaft against axial movement and for preventing rotation of said pusher means, whereby rotation of said pusher shaft in opposite directions causes axial inward and outward movement of said pusher means within said central opening.

4. The cutting tool of claim 3 wherein said pusher means has a plurality of circumferentially spaced tapered cam surfaces corresponding in number to the number of cutting tool holders within said cutting head and engageable by correspondingly tapered cam followers on the radial inner ends of said cutting tool holders.

5. The cutting tool of claim 1 wherein each of said guideways has a leading side edge in substantially direct radial alignment with the axial center of said cutting head and a trailing side edge which is parallel to and spaced from said leading side edge, and said cutting tool holders have parallel spaced apart side walls in close sliding engagement with the respective leading and trailing side edges of said guideways, said trailing side edge of each of said guideways having a keyway therein, and said cutting tool holders having a key on one of said side walls which is received in said keyway.

6. The cutting tool of claim 1 further comprising spring means for biasing said cutting tool holders radially inwardly into engagement with said pusher means, a flange on the axial inner side of said cutting tool holders, and a radial slot in the back side of said guideways in alignment with said flange, said spring means being received in said radial slot and acting on said flange to bias said cutting tool holders radially inwardly as aforesaid.

7. The cutting tool of claim 6 further comprising a spring loading screw contained in a radial bore in said cutting head in radial alignment with each of said radial slots, said spring means being interposed between each said spring loading screw and flange, whereby the preload on said spring means may be varied by rotating said spring loading screws.

8. The cutting tool of claim 1 further comprising spring means for biasing said cutting tool holders radially inwardly into engagement with said pusher means, and a removable end plate mounted on said end face closing the axial outer end of said central opening, said end plate having a plurality of circumferentially spaced aligned stop shoulders thereon in radial alignment with said cutting tool holders, and said cutting tool holders having angularly sloped stop shoulders on the axial outer side thereof overlying said stop shoulders on said end plate, whereby said stop shoulders limit the maximum extent of radial inward movement of said cutting tool holders in said guideways.

9. The cutting tool of claim 1 further comprising means for causing axial movement of said pusher shaft during rotation of said pusher shaft, said pusher means being connected to said pusher shaft for rotation and axial movement therewith, the axial outer end of said pusher means being generally conical for engagement by correspondingly tapered cam followers on the radial inner ends of said cutting tool holders.

10. The cutting tool of claim 1 further comprising adjustable stop screw means movable into overlapping engagement with the axial inner end of said pusher means when said pusher means is in its axial outermost position for locking said cutting tool holders in their radial outermost positions during a cutting operation.

11. A cutting tool comprising a cutting head having a generally radially extending end face at one end, a central opening extending longitudinally into said cutting head from said end face, a plurality of circumferentially spaced guideways in said end face extending radially from the outer periphery of said cutting head to said central opening, each said guideway having a cutting tool holder mounted for radial movement therein, pusher means mounted for axial movement in said central opening into engagement with the radial inner ends of said cutting tool holders to cause simultaneous radial outward movement of said cutting tool holders, and means for moving said pusher means axially within said central opening, said means for moving said pusher means axially within said central opening comprising a pusher shaft extending axially inwardly from said pusher means, means for rotating said pusher shaft in said central opening, and means for causing axial movement of said pusher means in response to such rotation of said pusher shaft, said means for rotating said pusher shaft comprising a first bevel gear keyed to said pusher shaft, and a second bevel gear extending at right angles to said first bevel gear and in meshing engagement therewith, said second bevel gear being accessible for rotation through a radial opening in said cutting head, and a stepped bore at the axial inner end of said central opening, said pusher shaft having a radial flange thereon which is closely slidably received in said stepped bore for supporting said pusher shaft coaxially within said central opening, said stepped bore having a thrust shoulder adjacent the axial inner end thereof which is engaged by said radial flange for absorbing axial thrust loads.

12. The cutting tool of claim 11 wherein said first bevel gear has a hub which extends into said stepped bore in close sliding engagement therewith, the axial inner end of said hub engaging said radial flange on said pusher shaft.

13. The cutting tool of claim 11 further comprising a pilot member in said central opening surrounding said pusher shaft, said pilot member being secured in place within said central opening and having a flat face on one side which provides a bearing support for said second bevel gear.

14. The cutting tool of claim 11 further comprising spring means for biasing said cutting tool holders radially inwardly into engagement with said pusher means, a flange on the axial inner side of said cutting tool holders, and a radial slot in the back side of said guideways in alignment with said flange, said spring means being received in said radial slot and acting on said flange to bias said cutting tool holders radially inwardly as aforesaid.

15. The cutting tool of claim 14 further comprising a spring loading screw contained in a radial bore in said cutting head in radial alignment with each of said radial slots, said spring means being interposed between each said spring loading screw and flange, whereby the preload on said spring means may be varied by rotating said spring loading screws.

16. The cutting tool of claim 11 further comprising spring means for biasing said cutting tool holders radially inwardly into engagement with said pusher means, and a removable end plate mounted on said end face closing the axial outer end of said central opening, said end plate having a plurality of circumferentially spaced angled stop shoulders thereon in radial alignment with said cutting tool holders, and said cutting tool holders having angularly sloped stop shoulders on the axial outer side thereof overlying said stop shoulders on said end plate, whereby said stop shoulders limit the maximum extent of radial inward movement of said cutting tool holders in said guideways.

17. The cutting tool of claim 11 further comprising adjustable stop screw means movable into overlapping engagement with the axial inner end of said pusher means when said pusher means is in its axial outermost position for locking said cutting tool holders in their radial outermost positions during a cutting operation.

18. A cutting tool comprising a cutting head, a plurality of circumferentially spaced cutting tool holders mounted for radial movement relative to said cutting head, pusher means mounted for axial movement in said cutting head into engagement with the radial inner ends of said cutting tool holders to cause simultaneous radial outward movement of said cutting tool holders, and means for moving said pusher means axially within said cutting head, said means for moving said pusher means axially comprising a pusher shaft extending axially inwardly from said pusher means, means for rotating said pusher shaft, and means for causing axial movement of said pusher means in response to rotation of said pusher shaft, said means for rotating said pusher shaft comprising a first bevel gear keyed to said pusher shaft, and a second bevel gear extending at right angles to said first bevel gear and in meshing engagement therewith, said second bevel gear being accessible for rotation through a radial opening in said cutting head, a pilot member in said cutting head surrounding said pusher shaft, said pilot member having a flat face on one side which provides a bearing support for said second bevel gear, and a post on said flat face for receipt of said second bevel gear thereon.

19. The cutting tool of claim 18 further comprising a stepped bore in cutting head, said pusher shaft having a radial flange adjacent the axial inner end thereof which is closely slidably received in said stepped bore for supporting said pusher shaft coaxially within said cutting head, said stepped bore having a thrust shoulder adjacent the axial inner end thereof which is engaged by said radial flange for absorbing axial thrust loads, said pusher means and pusher shaft having a threaded connection therebetween, and means for retaining said pusher shaft against axial movement and for preventing rotation of said pusher means, whereby rotation of said pusher shaft in opposite directions causes axial movement of said pusher means in opposite directions, said pusher means having a plurality of circumferentially spaced tapered cam surfaces thereon corresponding in number to the number of cutting tool holders within said cutting head and engageable by correspondingly tapered cam followers on the radial inner ends of said cutting tool holders.

20. The cutting tool of claim 18 further comprising means for causing axial movement of said pusher shaft during rotation of said pusher shaft, said pusher means being connected to said pusher shaft for rotational and axial movement therewith, the axial outer end of said pusher means being generally conical for engagement by correspondingly tapered cam followers on the radial inner ends of said cutting tool holders.

* * * * *